United States Patent [19]
Seki et al.

[11] Patent Number: 5,823,164
[45] Date of Patent: Oct. 20, 1998

[54] THROTTLE CONTROL DEVICE

[75] Inventors: Masato Seki, Obu; Takamasa Kitamura, Nagoya, both of Japan

[73] Assignee: Toyota Jidosha Kabushiki Kaisha, Toyota, Japan

[21] Appl. No.: 990,021

[22] Filed: Dec. 12, 1997

[30] Foreign Application Priority Data

Dec. 19, 1996 [JP] Japan ................................ 8-340174

[51] Int. Cl.⁶ .................................................. F02D 41/22
[52] U.S. Cl. .......................... 123/396; 123/399; 123/361
[58] Field of Search ................................ 123/396, 399, 123/361

[56] References Cited

U.S. PATENT DOCUMENTS

| 5,339,782 | 8/1994 | Golzer et al. | 123/399 |
| 5,429,092 | 7/1995 | Kamei | 123/399 |
| 5,447,134 | 9/1995 | Yokoyoma | 123/399 |
| 5,476,078 | 12/1995 | Pfalzgraf et al. | 123/399 |
| 5,553,581 | 9/1996 | Hirabayashi et al. | 123/399 |
| 5,602,732 | 2/1997 | Nichols et al. | 123/399 |
| 5,669,353 | 9/1997 | Shirai et al. | 123/399 |
| 5,706,782 | 1/1998 | Kurihara | 123/399 |

FOREIGN PATENT DOCUMENTS

| A-5-99058 | 4/1993 | Japan . |
| B2-6-94820 | 11/1994 | Japan . |
| A-8-158900 | 6/1996 | Japan . |

*Primary Examiner*—Erick R. Solis
*Attorney, Agent, or Firm*—Oliff & Berridge, PLC

[57] ABSTRACT

The throttle control device of this invention controls a throttle based on outputs of a position sensor including a first sensor and a second sensor which detect a position of a same object, wherein, when an abnormality is detected in one of the first sensor and the second sensor, throttle control is continued based on the output of the other sensor in which no abnormality is detected, and the throttle control is discontinued when the detection of the abnormality in one of the first sensor and the second sensor continues for a first predetermined time, and when an abnormality is detected in both the first sensor and the second sensor, throttle control is continued based on the output of one of the first sensor and the second sensor, and the throttle control is discontinued when the detection of the abnormality in both the first sensor and the second sensor continues for a second predetermined time which is shorter than the first predetermined time.

3 Claims, 3 Drawing Sheets

THROTTLE CONTROL DEVICE

BACKGROUND OF THE INVENTION

1. Field of the Invention

The present invention relates to a throttle control device including a double-system sensor, and more particularly, relates to a throttle control device which controls a throttle in consideration of an abnormal state of the double-system sensor.

2. Description of the Related Art

Japanese Publication for Opposition No. 6-94820 discloses an electronic control device which detects an abnormality of a double-system accelerator position sensor including a main sensor and a sub-sensor. This electronic control device displays an error message on a display device when the difference between signals output from the main sensor and the sub-sensor exceeds a predetermined threshold value, thereby indicating that an abnormality has been detected in the accelerator position sensor.

However, the Publication has not considered any processing to be executed against an abnormality, other than displaying an error message on a display device, when the abnormality has been detected in the accelerator position sensor.

The objective of the present invention is to provide a throttle control device which performs appropriate throttle control depending on the abnormal state of a double-system sensor.

SUMMARY OF THE INVENTION

The throttle control device of this invention controls a throttle based on outputs of a position sensor including a first sensor and a second sensor which detect a position of a same object, wherein, when an abnormality is detected in one of the first sensor and the second sensor, throttle control is continued based on the output of the other sensor in which no abnormality is detected, and the throttle control is discontinued when the detection of the abnormality in one of the first sensor and the second sensor continues for a first predetermined time, and when an abnormality is detected in both the first sensor and the second sensor, throttle control is continued based on the output of one of the first sensor and the second sensor, and the throttle control is discontinued when the detection of the abnormality in both the first sensor and the second sensor continues for a second predetermined time which is shorter than the first predetermined time.

In one embodiment of the invention, the position sensor is an accelerator position sensor for detecting a position of an accelerator.

In another embodiment of the invention, the position sensor is a throttle position sensor for detecting an opening of a throttle valve.

Thus, the invention described herein makes possible the advantage of providing a throttle control device which performs appropriate throttle control depending on the abnormal state of a double-system sensor.

These and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention will be described by way of example with reference to the accompanying drawings.

Figure 1:
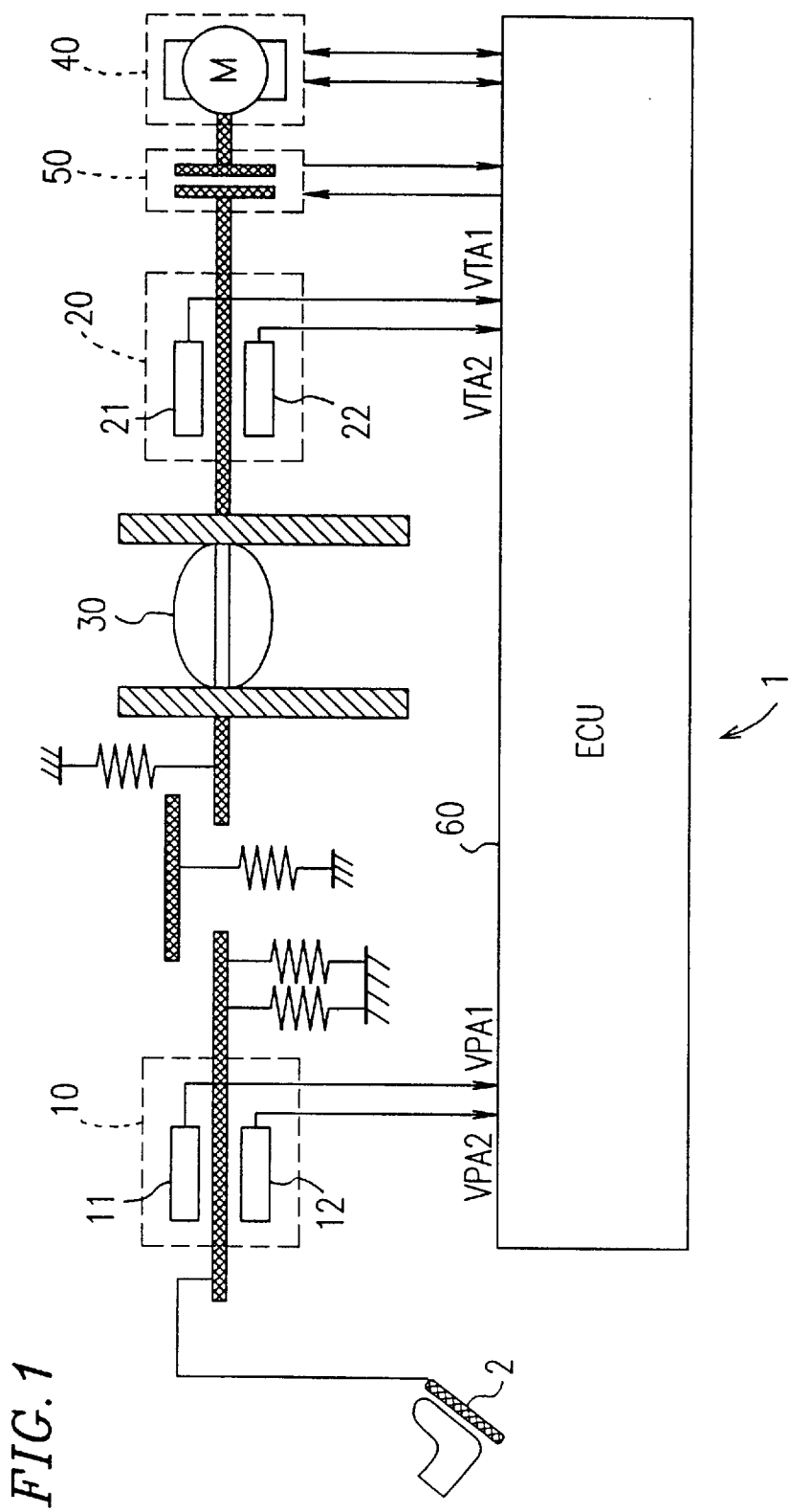
FIG. 1 is a structural view of a throttle control device according to the present invention.

FIG. 1 shows a throttle control device 1 of this example according to the present invention. The throttle control device 1 includes a double-system accelerator position sensor 10, a double-system throttle position sensor 20, a motor 40 for driving a throttle valve 30, an electromagnetic clutch 50 for controlling the connection/disconnection between the throttle valve 30 and the motor 40, and an electronic control unit (ECU) 60.

The accelerator position sensor 10 includes a main sensor 11 and a sub-sensor 12. The main sensor 11 detects the position of an accelerator based on the amount by which an accelerator pedal 2 is pressed, and outputs a detection signal VPA1 indicating the accelerator position to the ECU 60. The sub-sensor 12 also detects the accelerator position based on the amount by which the accelerator pedal 2 is pressed, and outputs a detection signal VPA2 indicating the accelerator position to the ECU 60.

The throttle position sensor 20 includes a main sensor 21 and a sub-sensor 22. The main sensor 21 detects the actual position of the throttle valve 30, and outputs a detection signal VTA1 indicating the actual position of the throttle valve 30 to the ECU 60. The sub-sensor 22 also detects the actual position of the throttle valve 30, and outputs a detection signal VTA2 indicating the actual position of the throttle valve 30 to the ECU 60.

The ECU 60 calculates a target opening of the throttle valve 30 based on the detection signals VPA1 and VPA2 output from the accelerator position sensor 10. The ECU 60 also controls the rotation of the motor 40 based on the detection signals VTA1 and VTA2 output from the throttle position sensor 20 so that the actual opening of the throttle valve 30 is closer to the target opening.

The ECU 60 controls the electromagnetic clutch 50 so that the throttle valve 30 and the motor 40 are electromagnetically connected to each other during the normal driving of a vehicle.

Figure 2:
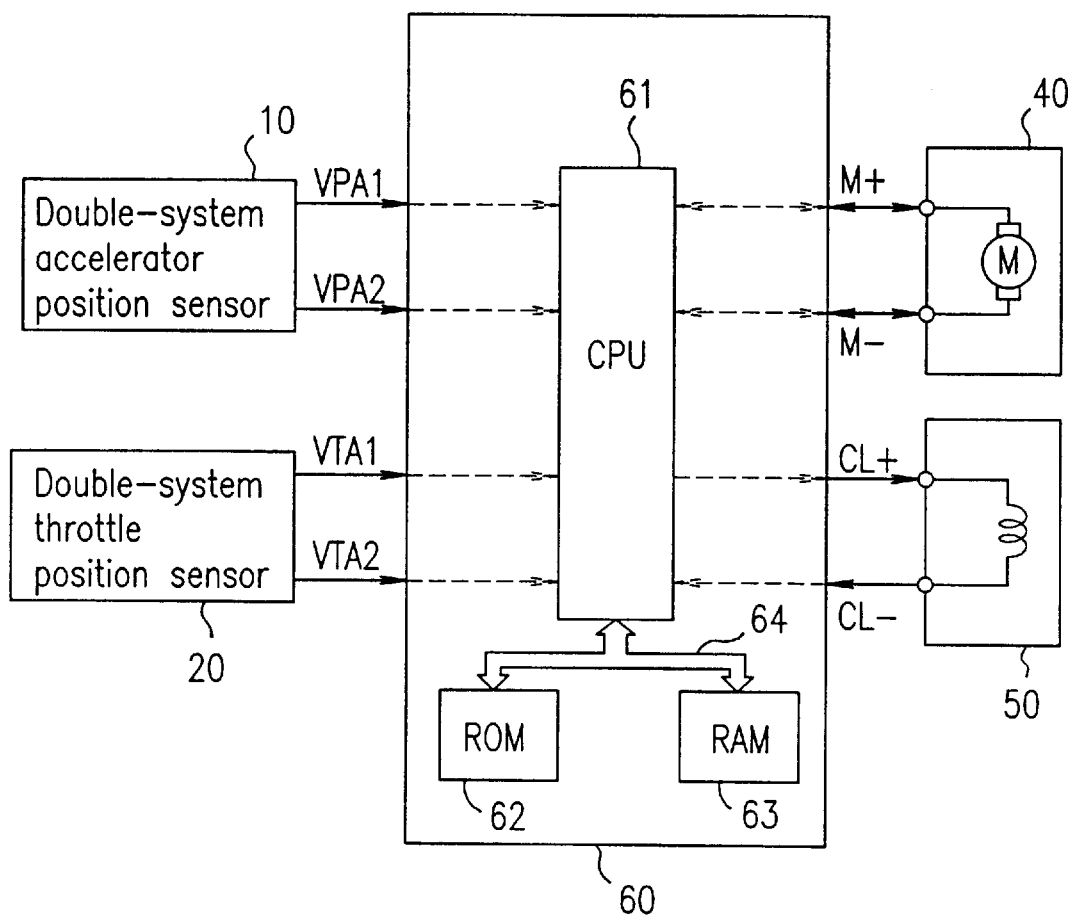
FIG. 2 is a structural view of an ECU of the throttle control device of FIG. 1.

FIG. 2 shows the configuration of the ECU 60, which includes a central processing unit (CPU) 61, a read-only memory (ROM) 62, and a random access memory (RAM) 63. The CPU 61, the ROM 62, and the RAM 63 are connected with one another via a bus 64.

The ROM 62 stores a program for an abnormality detection process for the throttle position sensor 20. The CPU 61 reads the program stored in the ROM 62 and executes the abnormality detection process.

Figure 3:
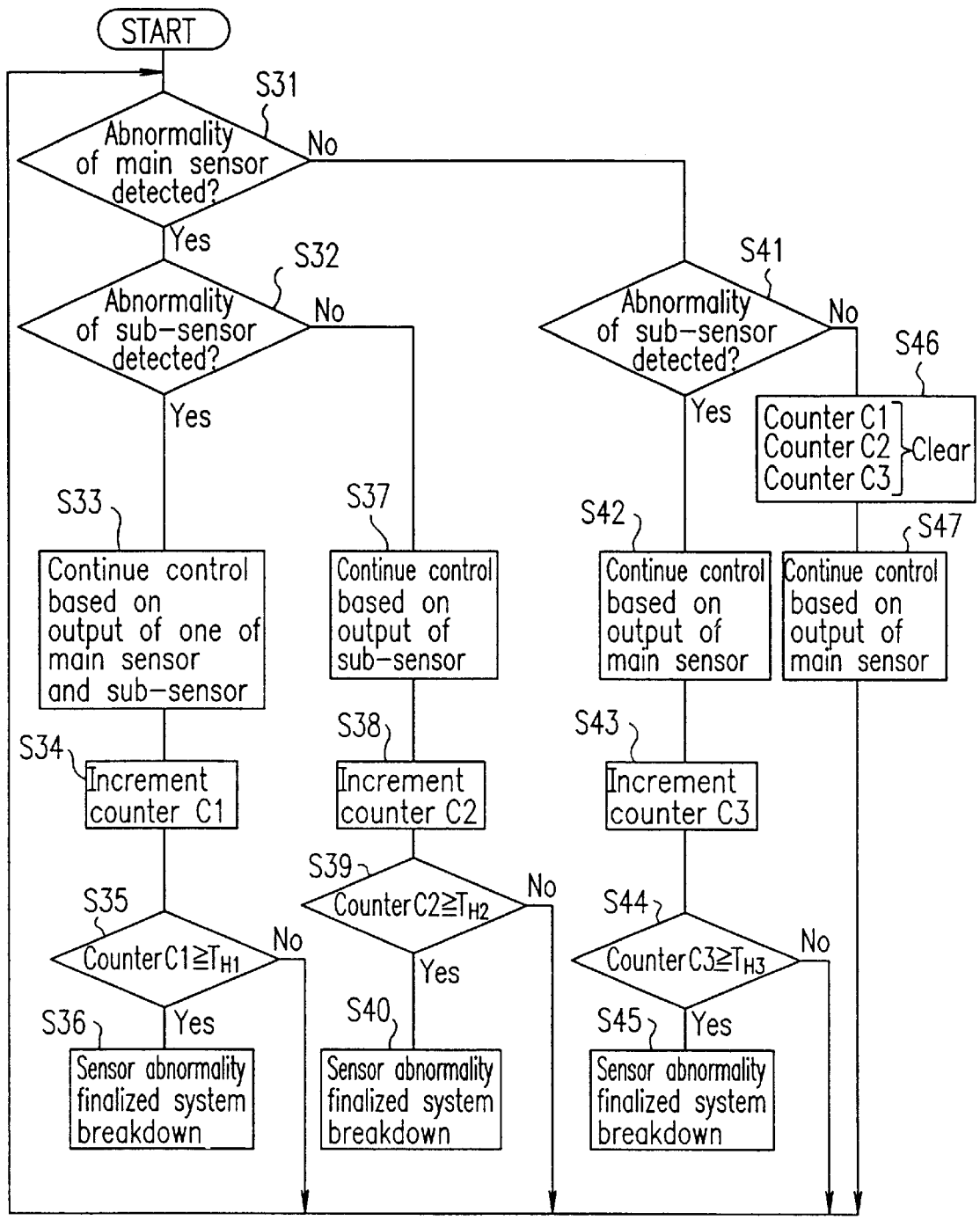
FIG. 3 is a flowchart showing an abnormality detection process for a throttle position sensor of the throttle control device of FIG. 1.

Hereinbelow, the abnormality detection process for the throttle position sensor 20 executed by the CPU 61 will be described step by step with reference to FIG. 3.

At step S31, the CPU 61 judges whether or not the main sensor 21 is abnormal. For example, the CPU 61 judges that the main sensor 21 is abnormal if the condition, "VTA1 $\leq T_{min1}$" or "VTA1 $\geq T_{max1}$" wherein VTA1 denotes the output of the main sensor 21, $T_{min1}$ denotes a predetermined lower limit, and $T_{max1}$ denotes a predetermined upper limit, is satisfied.

At steps S32 and S41, the CPU 61 judges whether or not the sub-sensor 22 is abnormal. For example, the CPU 61 judges that the sub-sensor 22 is abnormal if the condition, "VTA2≦$T_{min2}$" or "VTA2≧$T_{max2}$" wherein VTA2 denotes the output of the sub-sensor 22, $T_{min2}$ denotes a predetermined lower limit, and $T_{max2}$ denotes a predetermined upper limit, is satisfied.

If the judgment results at steps S31 and S41 indicate that both the main sensor 21 and the sub-sensor 22 are not abnormal, the process proceeds to step S46.

At step S46, the CPU 61 resets counters C1, C2, and C3 at zero. The counter C1 is used to measure the duration of the state where both the main sensor 21 and the sub-sensor 22 are abnormal. The counter C2 is used to measure the duration of the state where the main sensor 21 is abnormal while the sub-sensor 22 is normal. The counter C3 is used to measure the duration of the state where the main sensor 21 is normal while the subsensor 22 is abnormal. The counters C1, C2, and C3 can be implemented by an arbitrary known method, for example, by hardware or by software.

At step S47, the CPU 61 performs the throttle control based on the output of the main sensor 21.

If the judgment results at steps S31 and S41 indicate that the main sensor 21 is normal while the subsensor 22 is abnormal, the process proceeds to step S42.

At step S42, the CPU 61 continues the throttle control based on the output of the main sensor 21 which has been judged normal. That is, even if an abnormality is detected in the sub-sensor 22, the throttle control will not be discontinued immediately after the detection of the abnormality. This prevents the throttle control from being immediately discontinued when an abnormality is mistakenly detected in the sub-sensor 22 due to noise entering or the like.

At step S43, the CPU 61 increments the counter C3. At step S44, the CPU 61 judges whether or not the value of the counter C3 is equal to or more than a predetermined threshold value $T_{H3}$. If "Yes", it means that the state where the main sensor 21 is normal while the sub-sensor 22 is abnormal has continued for a predetermined time $T_3$. In such a case, the CPU 61 confirms that the throttle position sensor 20 is abnormal and discontinues the throttle control at step S45.

If the judgment results at steps S31 and S32 indicate that the main sensor 21 is abnormal while the sub-sensor 22 is normal, the process proceeds to step S37.

At step S37, the CPU 61 continues the throttle control based on the output of the sub-sensor 22 which has been judged normal. That is, even if an abnormality is detected in the main sensor 21, the throttle control will not be discontinued immediately after the detection of the abnormality. This prevents the throttle control from being immediately discontinued when an abnormality is mistakenly detected in the main sensor 21 due to noise entering or the like.

At step S38, the CPU 61 increments the counter C2. At step S39, the CPU 61 judges whether or not the value of the counter C2 is equal to or more than a predetermined threshold value $T_{H2}$. If "Yes", it means that the state where the main sensor 21 is abnormal while the sub-sensor 22 is normal has continued for a predetermined time $T_2$. In such a case, the CPU 61 confirms that the throttle position sensor 20 is abnormal and discontinues the throttle control at step S40.

If the judgment results at steps S31 and S32 indicate that both the main sensor 21 and the sub-sensor 22 are abnormal, the process proceeds to step S33.

At step S33, the CPU 61 continues the throttle control based on the output of one of the main sensor 21 and the sub-sensor 22 with which the opening of the throttle valve 30 is controlled to be smaller.

The CPU 61 performs the throttle control so that the opening of the throttle valve 30 is smaller as the output of the main sensor 21 or the sub-sensor 22 is larger. Accordingly, at step S33, the CPU 61 selects one of the main sensor 21 and the sub-sensor 22 of which output is larger, and performs the throttle control based on the output of the selected sensor.

At step S34, the CPU 61 increments the counter C1. At step S35, the CPU 61 judges whether or not the value of the counter C1 is equal to or more than a predetermined threshold value $T_{H1}$. If "Yes", it means that the state where both the main sensor 21 and the subsensor 22 are abnormal has continued for a predetermined time $T_1$. In such a case, the CPU 61 confirms that the throttle position sensor 20 is abnormal and discontinues the throttle control at step S36.

Predetermined times $T_1$, $T_2$, and $T_3$ are set so as to satisfy the relationship of $T_1 < T_2$ and $T_1 < T_3$. This relationship is realized by determining the predetermined threshold values $T_{H1}$, $T_{H2}$, and $T_{H3}$ so as to satisfy the relationship of $T_{H1} < T_{H2}$ and $T_{H1} < T_{H3}$, for example.

By setting the predetermined times $T_1$, $T_2$, and $T_3$ to satisfy the above relationship, the abnormality of the throttle detection sensor is confirmed in a shorter time in the state where both the main sensor 21 and the subsensor 22 are abnormal than in the state where either one of the main sensor 21 and the sub-sensor 22 is abnormal. This prevents the throttle control from being diverged due to breakdowns of both the main sensor 21 and the subsensor 22.

The predetermined time $T_1$ is preferably sufficiently shorter than the predetermined time $T_2$ and also sufficiently shorter than the predetermined time $T_3$. For example, when the predetermined times $T_2$ and $T_3$ are in the order of several seconds, the predetermined time $T_1$ is preferably in the order of several hundred milliseconds. The predetermined times $T_2$ and $T_3$ may be the same.

At steps S36, S40, and S45, the throttle control may be discontinued by various methods. For example, the CPU 61 discontinues the throttle control by turning off both the motor 40 and the electromagnetic clutch 50.

In this way, the electronic throttle control is discontinued in the case where the abnormality of the throttle position sensor 20 is confirmed. As a precaution, therefore, it is preferable to provide a mechanism for controlling the throttle valve 30 in place of the electronic throttle control when such a case occurs, to ensure that the vehicle can be at least driven to a sidetrack. This emergency driving to a sidetrack is possible by mechanically linking the accelerator pedal 2 and the throttle valve 30 after the motor 40 and the electromagnetic clutch 50 are turned off.

According to the present invention, the CPU 61 can also execute the abnormality detection process for the accelerator position sensor 10 in a manner similar to that for the throttle position sensor 20 described above. In the case of the accelerator position sensor 10, the throttle control is performed so that the opening of the throttle valve 30 is larger as the output of the main sensor 11 or the sub-sensor 12 of the accelerator position sensor 10 is larger. Accordingly, one of the main sensor 11 and the sub-sensor 12 of which output is smaller is selected. In the case of the abnormality detection process for the accelerator position sensor 10, therefore, the CPU 61 selects one of the main sensor 11 and the sub-sensor 12 of which output is smaller at step S33 in the flowchart of FIG. 3, to continue the throttle control based on the output of the selected sensor.

Thus, in the throttle control device according to the present invention, when an abnormality is detected in either one of the first and second sensors, the throttle control is continued based on the output of the other sensor in which no abnormality has been detected. This prevents the throttle control from being immediately discontinued even if an abnormality is mistakenly detected in either one of the first and second sensors due to noise entering or the like. The throttle control is discontinued when the detection of an abnormality in either one of the first and second sensors continues for a first predetermined time. The first predetermined time is provided to confirm the detected abnormality.

When an abnormality is detected in both the first and second sensors, the throttle control is continued based on the output of one of the first and second sensors. This prevents the throttle control from being immediately discontinued even if an abnormality is mistakenly detected in both the first and second sensors due to noise entering or the like. The throttle control is discontinued when the detection of an abnormality in both the first and second sensors continues for a second predetermined time. The second predetermined time is provided to confirm the detected abnormality.

The predetermined second time is shorter than the predetermined first time. That is, the abnormality detected in both the first and second sensors is confirmed in a shorter time than the abnormality detected in either one of the first and second sensors. This prevents the throttle control from being diverged due to breakdowns of both the first and second sensors.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A throttle control device for controlling a throttle based on outputs of a position sensor including a first sensor and a second sensor which detect a position of a same object, wherein, when an abnormality is detected in one of the first sensor and the second sensor, throttle control is continued based on the output of the other sensor in which no abnormality is detected, and the throttle control is discontinued when the detection of the abnormality in one of the first sensor and the second sensor continues for a first predetermined time, and when an abnormality is detected in both the first sensor and the second sensor, throttle control is continued based on the output of one of the first sensor and the second sensor, and the throttle control is discontinued when the detection of the abnormality in both the first sensor and the second sensor continues for a second predetermined time which is shorter than the first predetermined time.

2. A throttle control device according to claim 1, wherein the position sensor is an accelerator position sensor for detecting a position of an accelerator.

3. A throttle control device according to claim 1, wherein the position sensor is a throttle position sensor for detecting an opening of a throttle valve.

* * * * *